United States Patent [19]
Burford

[11] Patent Number: 5,879,546
[45] Date of Patent: Mar. 9, 1999

[54] WATER PURIFICATION AND RECOVERY SYSTEM

[76] Inventor: Robert M. Burford, 905A West Fairway Dr., Lancaster, Pa. 17603

[21] Appl. No.: 859,069

[22] Filed: May 20, 1997

[51] Int. Cl.$^6$ .................................................. C02F 1/463
[52] U.S. Cl. ..................... 210/96.1; 204/661; 204/666; 210/192; 210/199; 210/200; 210/203; 210/205; 210/257.1; 422/186.3
[58] Field of Search ..................... 204/661, 665, 204/666; 205/743, 752, 756; 95/78; 96/63, 68, 88; 210/192, 198.1, 199, 202, 203, 205, 206, 96.1, 257.1, 258; 422/186.3

[56] References Cited

U.S. PATENT DOCUMENTS

| | | | |
|---|---|---|---|
| 4,388,195 | 6/1983 | von Hagel et al. | 210/709 |
| 4,655,933 | 4/1987 | Johnson et al. | 210/721 |
| 5,593,476 | 1/1997 | Coppom | 95/78 |
| 5,616,250 | 4/1997 | Johnson et al. | 210/695 |
| 5,635,059 | 6/1997 | Johnson | 210/192 |

OTHER PUBLICATIONS

Paper by Robert M. Burford, entitled "Point Source Control And Electrocoagulation", published Feb., 1996.

*Primary Examiner*—Peter A. Hiruskoci

[57] ABSTRACT

A water purification system has a series of sequential operating stations each adapted to remove successively finer suspended or dissolved matter from contaminated water. The sequential steps employed are a pH neutralization step, a particulate precipitation step, a pre-filtration step, a particulate coagulation step and a final filtration step. The particulate coagulation is achieved by means of a novel apparatus for the generation of an especially activated oxygen combined with electrically charged probes for agglomerating the particulate which is filtered in a subsequent station. The initially contaminated water passes through each step in the process and emerges as clean, reusable, water. By employing the process and the system of the invention, the process water is recycled, rather than wasted.

8 Claims, 2 Drawing Sheets

5,879,546

WATER PURIFICATION AND RECOVERY SYSTEM

BACKGROUND OF THE INVENTION

1. Field of the Invention

This invention relates to apparatus and methods for the purification of water, and more particularly to apparatus and methods for the purification of water for industrial, commercial and sanitary chemical processing.

2. Description of the Related Art

As the world's population increases and as technology simultaneously advances, the need for water becomes greater. A very strong parallel phenomenon is that the pollution of natural resources, water in particular, is becoming of greater concern.

In many industrial, commercial or public situations where water is used to clean, process, or transport products, conservation of water is of paramount importance. Washing of vehicles, cleansing of processed parts or cooling of air, products or equipment are typical examples of situations requiring conservation of water. In the case of water used for cooling, processes such as condensation, refrigeration, atmospheric evaporation or heat transfer are frequently used. In the case of water used for washing or cleansing, some form of filtration is common to avoid excess disposing of the dirty water.

In certain industrial, commercial and sanitary uses of water to wash parts of coatings or chemicals, the removal of the impurities from the water is difficult. An example of the sort of chemical processing which utilizes large amounts of water to wash the parts both before and after processing is the plating industry. In fact, over 50% of the process steps in plating involve rinsing, and, the cleaner the water, the better the rinse. There are situations in the plating industry in which the quantity of available supply water may be unacceptable to use in plating rinses because of contamination. Cleansing of parts prior to plating is often done with various surface preparation baths, and those parts are normally washed again in clear water prior to plating. After plating, a washing is done to remove excess coating materials. In the first case the rinse water becomes acid or alkaline, and in the second case the water accumulates metal deposits, which may be toxic. In the tradition of the industry, the rinsing water is treated and drained to a sewer. This practice is considered to be both environmentally and economically unsound. In addition to the waste of large volumes of water, significant amounts of metal scrap is being lost.

An attempt to purify water for use in applications such as in the plating industry has been disclosed in U.S. Pat. Nos. 4,563,286 and 4,655,933 to Johnson et al. The Johnson et al. patents recognize that an ionized oxygen molecule will attach to larger molecules and cause a coagulation, or flocculation, to increase the size and improve the filtration efficacy. Johnson et al. employ a magnetic field in combination with an ultraviolet radiation source to generate the ionized oxygen. While the principles of the Johnson et al. disclosures pertain to the problem addressed by the present invention, the method applied to the problem is different, the result achieved deals with only one aspect of the problem, and the Johnson et al. teaching has been found to be inadequate for the commercial needs of the industry.

In particular, it has not heretofore been known in the field of water purification to employ an especially aggressive form of oxygen, known as singlet, or nascent, oxygen, to cause finer particles in the water flow to acquire a charge and to further use a charged electrode in the flow path to agglomerate the finer particles into a larger mass which, when the polarity of the electrode is reversed, is readily removed from the water by a final filter.

It is therefore an object of this invention to provide a water purification system capable of removing suspended and dissolved particulate matter in process water, making it suitable for reuse, while maintaining product quality and production as previously obtained only when using fresh water.

A further object of this invention is to provide a water purification system capable of preventing the waste of industrial, commercial or sanitary process water through effective recycling.

Other objects and advantages will be more fully apparent from the following disclosure and appended claims.

SUMMARY OF THE INVENTION

The water purification system of the invention provides a multi-step apparatus and method resulting in clean, reusable water. The steps employed include neutralization, precipitation, pre-filtration, electrocoagulation and final filtration. The steps of the water purification system are arranged to successively remove increasingly finer materials from the water being cleaned. The electrocoagulation process involves generating an activated, charged, oxygen form in a novel apparatus incorporating ultraviolet radiation and electrical discharge, combining the activated oxygen with suspended matter and agglomerating the matter on an electrically charged probe.

DETAILED DESCRIPTION OF THE INVENTION AND PREFERRED EMBODIMENTS THEREOF

Figure 1:
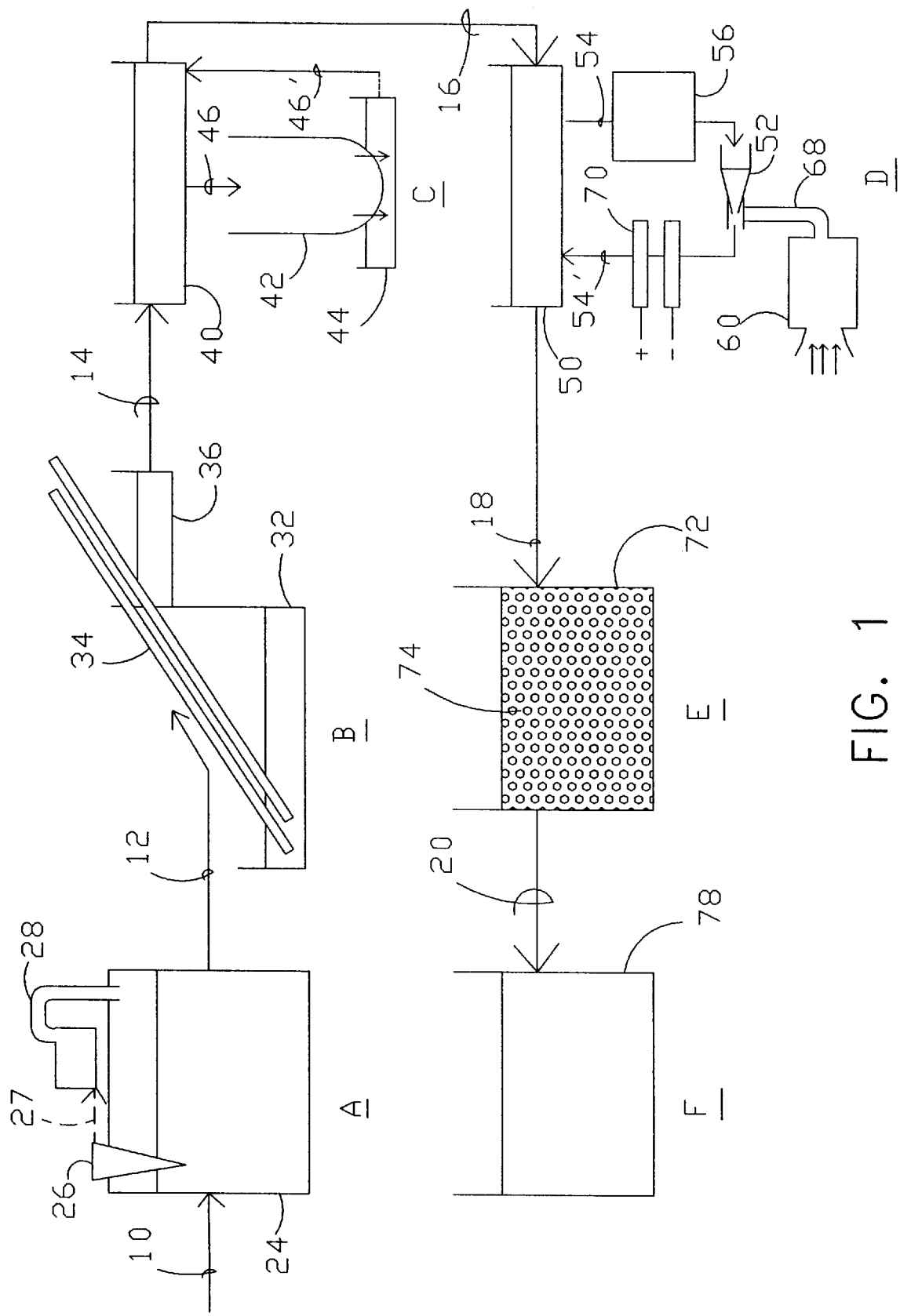
FIG. 1 is a schematic diagram of the water purification system of the invention.

As shown schematically in FIG. 1, the system of the present invention comprises a novel combination of individual but cooperative and interrelated processes, each of which is directed to perform a different degree of water purification. Contaminated water 10 flows from the prior process station, such as for example, a plating plant, into each sequential station in the apparatus of the invention. Various pumps are included as required for the process of the invention, but are not shown in the drawings for purpose of clarity. The water being treated at each station is identified by an arrow carrying numbers 10, 12, 14, 16, 18, and 20 to signify successive degrees of cleanliness in each of the succeeding process stations A, B, C, D, E, and F. The process steps of each station are operatively identified as follows:

A—neutralization;
B—precipitation;
C—pre-filtration;
D—electrocoagulation;
E—final filtration; and
F—clean water storage.

At the upper left corner of FIG. 1, contaminated water input 10 flows from an industrial plating plant (not shown)

used by way of example to pH adjusting tank 24. The rate of water flow between stations A–F of the system of the invention is between 20–200 liters (5–50 gallons) per minute, and most preferably from 60–80 liters (15–20 gallons) per minute, although particular individual process stations within the system circulate the water internally within the station in question at a greater flow rate. A probe 26, as is known in the trade and adapted for the determination of the pH of incoming water 10, is mounted so as to be in contact with the water in pH adjusting tank 24. Probe 26 tests the pH and then generates and transmits a signal 27, related to the determined pH of the water, to pH adjuster 28 which is capable of adding acid or alkali as required to achieve a programmed level of pH. In the system disclosed, a pH-neutral water is desired, thus the equipment is set to achieve a level of pH 7.0. While FIG. 1 portrays probe 26 and pH adjuster 28 separately, with shut down control limits of pH 6.5–9.5, it is recognized that a unitary probe and adjuster apparatus, such as that supplied under the trade name of ProMeter®, may be employed in the preferred embodiment.

The pH-adjusted water 12 is discharged from pH adjuster tank 24 to enter precipitation tank 32. Precipitation tank 32 removes a major portion of larger particulate matter suspended in pH adjusted water 12 by forcing the water upward along a number of inclined plates 34 (only two of which are shown) in repetitive cycles. Precipitation tank 32 is also known in the trade as a clarifier. Each successive pass of water 12 over an inclined plate 34 causes a portion of the suspended matter to precipitate down into tank 32. At the completion of sequential passes of water over the series of inclined plates 34, clarified water 14 is deposited into transfer tank 36 and then moved to pre-filter tank 40. The precipitate collected in tank 32 is removed and processed so as to recover surplus metals from the prior plating process.

Pre-filter tank 40 acts as a holding tank which feeds clarified water to pre-filter unit 42, such as, for example a bag filter as is well known, with a porosity capable of filtering unprecipitated suspended particulate. Water flow to and from filter unit 42 is indicated respectively by arrows 46, 46'. After passing through pre-filter 42, the partially cleansed water is deposited in pre-filter transfer tank 44 prior to being returned to pre-filter tank 40 as noted by arrow 46'. Extracted solids remain in pre-filter unit 42. Pre-filter unit 42 effectively removes smaller particles than are removed by precipitation in step B. The flow from pre-filter tank 40 to pre-filter transfer tank 44 and back again (flow 46, 46') occurs at a rate of about 200 liters (50 gallons) per minute. This increase in speed over the system flow rate of 60–80 liters per minute is achieved by an auxiliary pump (not shown) and is effective in amplifying the filtration results by a factor of about 3:1. It is understood that an alternate filtration medium may be substituted for filter bag 42, such as, for example, a multi-media filter, preferably capable of 10 micron filtration, such as one sold under the Kisco® brand.

At the output of pre-filtration station C, the cleaner water is carried along flow path 16 to polishing tank 50 in electrocoagulation station D. Water from polishing tank 50 is pumped (pump not shown) at a flow rate of about 140 liters (35 gallons) per minute, and travels through line 54 into fine filter 56, typically a microporous cartridge filter having a disposable element. An acceptable filter for this purpose is designated HUR series, supplied by Harmsco®. The output water from fine filter 56 next passes into venturi 52. The water passing through venturi 52, creates a pressure differential to cause a quantity of air containing singlet oxygen ($O_1$) to be introduced to the water flow at the suction inlet 68 connecting to venturi 52. Singlet oxygen may also be known as nascent oxygen, defined in Webster's Unabridged Dictionary of the English language as oxygen just released from a compound and having unusual chemical activity because atoms of the oxygen element have not combined to form molecules. Due to the rapid transition of chemical identity, the exact nature of the oxygen is not known.

Figure 2:
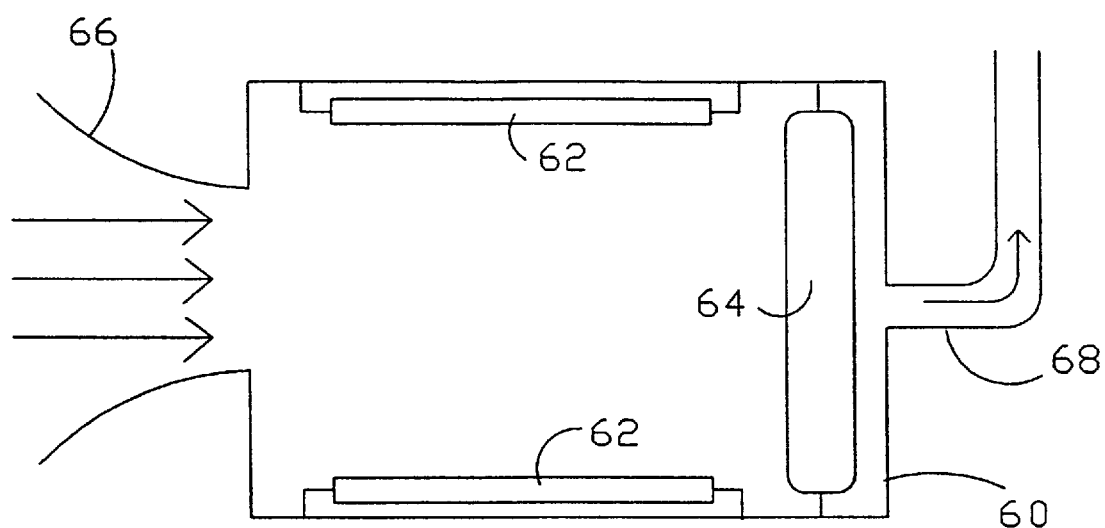
FIG. 2 is an enlarged schematic diagram of an ionization chamber of the water purification system shown in FIG. 1.

Singlet oxygen and/or nascent oxygen (both of which are referred to hereafter as activated oxygen) is obtained for purposes of the invention by treatment of air in ionization chamber 60, illustrated in a position below polishing tank 50 in FIG. 1, and shown in greater detail in FIG. 2. As illustrated in FIG. 2, air supply enters chamber 60 via inlet 66. The supply air passes through an ultraviolet radiation field produced from a UV radiation source, such as lamps 62, which radiate at germicidal frequencies. Subsequently, the supply air is energized by passing through electronic discharge air cleaner 64, for example Model 501 air cleaner by Polinex Corp. of Kansas City, Mo., to finally exit as negatively charged activated oxygen through suction inlet 68, which is connected to venturi 52 (FIG. 1). The invention recognizes that activated oxygen will aggressively bond to particulate matter, imposing their negative charge thereon. The force to move the air supply through ionization chamber 60 and into water flow line 54, 54' is generated by venturi 52. The use of pure oxygen gas or oxygen enriched air will enhance the generation of activated oxygen.

As activated oxygen enters the water flow 54–54' (FIG. 1) which has passed through precipitation and pre-filtration steps for removal of its larger particulate, the smaller particles remaining suspended in the water are attracted to and become attached to the activated oxygen. The strong unbalanced charge of the activated oxygen makes the suspended particle charged. With the water flowing from polishing tank 50 to venturi 52 at a rate of about 140 liters (35 gallons) per minute, a thorough blending occurs to cause virtually all suspended particulate and some dissolved solids remaining in the water to become negatively charged due to oxygen attachment.

The effluent water from venturi 52, including a quantity of activated oxygen attached to suspended particulate matter, flows back to polishing tank 50 through line 54'. Intermediate venturi 52 and polishing tank 50 water flows past a pair of electrodes, probes 70, immersed therein. Probes 70 are each connected to an electric potential of opposed polarity such that the negatively charged activated oxygen-connected particles agglomerate on positively charged probe 70. The polarity of each probe 70 is reversed alternatingly and oppositely so that one probe is always charged positively to attract and agglomerate particles. When the polarity is reversed, the agglomerated particles are discharged from the collecting probe 70 into the water flow. Since the water flow rate in electrocoagulation station D is on the order of three times faster than in the overall purification system, the water flows past probes 70 multiple times and probes 70 collect a greater amount of particulate each time. It has been further recognized that use of a plurality of pairs of probes 70 substantially increases the electrocoagulation efficacy.

As the agglomerated particulate is discharged from electrodes 70, it is carried by water flow 18 to activated carbon filtration medium 74 in filter tank 72. The carbon medium 74 removes substantially all of the agglomerated residual matter in the water, leaving substantially clean water to pass via line 20 into optional clean water storage container 78. Subsequently, the cleaned water is returned to the process line in the plating plant for the rinsing of additional parts, thereby recycling up to 90% of the water volume. If a storage container is not included, cleaned water is reintroduced directly to the process line.

The tanks utilized in the apparatus disclosed are molded, according to the preferred embodiment, of a polypropylene resin.

The present invention thus provides a particular and novel solution to water contamination, water waste and process chemical waste in the plating and related industries. By creating a complete and thorough system of neutralization and filtration, significantly enhanced by electrocoagulation of the finest particulate, over 90% of the process water and plating metals are reclaimed. As described, the combination of a novel apparatus for the generation of activated oxygen and the agglomeration of particulate enhanced thereby provides a uniquely effective water purification system. The chart below depicts the comparision of the level of contaminants in water derived from a plating plant before and after treatment by the electrocoagulation unit of the invention. The contaminant levels "before" treatment represent readings taken from water processed according to prior art chemical destruction methods.

ELECTROCOAGULATION RESULTS

| Substance | Before (p.p.m.) | After(p.p.m.) | Reduction % |
|---|---|---|---|
| Aluminum | 7.66 | 0.964 | 87.5% |
| Copper | 0.313 | 0.027 | 91.4% |
| Nickel | 0.074 | 0.01 | 86.5% |
| Chromium | 1.12 | 0.3 | 91.1% |
| Cadmium | 2.14 | 0.085 | 96.1% |
| Zinc | 1.66 | 0.01 | 99.5% |
| Lead | 1.84 | 0.05 | 97.3% |
| Tin | 0.254 | 0.2 | 22.3% |
| Iron | 2.09 | 0.025 | 98.1% |

The results noted above clearly indicate a significant improvement in water purity through the use of the invention disclosed herein. The average reduction of metal contaminants of over 90% yields a high quality, recyclable rinse water.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A water purification and recovery system comprising:
   (a) a neutralization station having means for receiving contaminated water from a processing facility and adjusting the pH thereof to a selected value;
   (b) a precipitation station connected for receiving pH adjusted water from said neutralization station and promoting precipitation of particulate matter suspended in said pH adjusted water;
   (c) means operative to cause said contaminated and pH adjusted water to flow through said neutralization and precipitation stations at a first selected flow rate;
   (d) a pre-filtration station connected for receiving water from said precipitation station and including a filter and means for recycling said water through said pre-filtration station at a second selected flow rate that is faster than said first selected flow rate;
   (e) an electrocoagulation station connected for receiving pre-filtered water from said pre-filtration station and including means for coagulating residual particulate matter and dissolved matter in said pre-filtered water substantially at said second flow rate;
   (f) a final filtration station connected for receiving water from said electrocoagulation station and including means for filtering coagulated particulate matter from said pre-filtered water;
   (g) a clean water storage station connected for receiving finally filtered water from said final filtration station and having storage means for retaining said finally filtered water for additional use in said processing facility; and
   (h) means to move water substantially continuously through and within each said station of said system and at said respective rates.

2. The water purification and recovery system as described in claim 1 wherein said electrocoagulation station includes a chamber having an ultraviolet lamp and an electronic air cleaner and means to pass air through said chamber for generating activated oxygen and means for introducing said activated oxygen into said pre-filtered water enabling said activated oxygen to combine with said residual particulate matter.

3. The water purification and recovery system as described in claim 2 wherein said means for introducing said activated oxygen into said pre-filtered water comprises a venturi nozzle.

4. The water purification and recovery system as described in claim 2, further comprising an electrode pair residing in a water transmission pipe within said electrocoagulation station, said electrode being connected to an electric source operative in one mode to instill a charge of a polarity effective to attract said residual particulate matter combined with said activated oxygen and in another mode to reverse said polarity to cause said particulate matter combined with said activated oxygen to be discharged therefrom.

5. The water purification and recovery system as described in claim 1 wherein said precipitation station comprises a plurality of substantially parallel inclined plates and means for flowing water upward over each of said plates in sequence to permit at least a portion of suspended particulate matter to precipitate from said upward flowing water.

6. A water purification and recovery system operative at a first selected water flow rate, said system comprising:
   (a) a neutralization station having means for receiving contaminated water from a processing facility connected to a pH adjusting tank mounting a pH determining probe adapted for generating and transmitting a signal to a pH adjuster capable of adding an appropriate amount of acid or alkali for adjusting the pH of said contaminated water to a substantially neutral value in response to said signal;
   (b) a precipitation station having a series of substantially parallel inclined plates and being connected to said neutralization station for receiving pH neutral water and operative for promoting precipitation of particulate matter suspended in said pH neutral water by causing said pH neutral water to flow in an upward direction over said plates;
   (c) a pre-filtration station connected for receiving water from said precipitation station and including a filter and means for passing said water through said filter at a second selected water flow rate substantially faster than said first selected water flow rate such that said water is filtered multiple times in said pre-filtration station as said water flows through said system;

(d) an electrocoagulation station connected for receiving pre-filtered water from said prefiltration station and having an ionization chamber including an ultraviolet radiation source and an electronic discharge source through which ionization chamber oxygen is drawn to produce activated oxygen and further including a venturi nozzle connected for introducing said activated oxygen to said pre-filtered water and including a pair of oppositely charged, alternating polarity probes residing in said pre-filtered water in said electrocoagulation station for attracting, coagulating, and subsequently discharging residual particulate matter and dissolved matter in said pre-filtered water as said pre-filtered water flows substantially at said second selected water flow rate;

(e) a final filtration station connected for receiving water from said electrocoagulation station and including a filtration tank for finally filtering coagulated particulate matter from said pre-filtered water;

(f) a storage tank for storing said finally filtered water for reintroduction to said processing facility; and (g) means for moving water through the system and within each said station of said system.

7. The water purification and recovery system as described in claim 1, further comprising a first means in fluid connection with said pre-filtration station and able to cause said water to flow therethrough at a flow rate that is faster than a flow rate at which said water flows through said system and a second means in fluid connection with said electrocoagulation station to cause said water to flow therethrough at a flow rate that is faster than the flow rate at which said water flows through said system.

8. A water purification and recovery system comprising:

(a) a neutralization station having means for receiving contaminated water from a processing facility and adjusting the pH thereof to a selected value;

(b) a precipitation station connected for receiving pH adjusted water from said neutralization station and promoting precipitation of particulate matter suspended in said pH adjusted water;

(c) a pre-filtration station connected for receiving water from said precipitation station and including a filter and means for recycling said water through said filter;

(d) an electrocoagulation station connected for receiving pre-filtered water from said pre-filtration station and having an ionization chamber including an ultraviolet radiation source and an electronic discharge air cleaner through which oxygen is drawn to produce activated oxygen and including a venturi nozzle connected for introducing said activated oxygen to said pre-filtered water and including a first electrically charged probe residing in said pre-filtered water in said electrocoagulation station for attracting and coagulating residual particulate matter and dissolved matter in a first polarity mode from said pre-filtered water and in a second polarity mode discharging agglomerated particulate matter from said first probe into said water and a second electrically charged probe connected for operation in a polarity opposite to that of said first probe;

(e) a final filtration station connected for receiving water from said electrocoagulation station and including means for filtering coagulated particulate matter from said pre-filtered water;

(f) a clean water storage station connected for receiving finally filtered water from said final filtration station and having storage means for retaining said finally filtered water for additional use in said processing facility; and (g) means to move water through and within each said station of said system.

* * * * *